United States Patent [19]

Gerkin et al.

[11] 3,935,132

[45] Jan. 27, 1976

[54] THERMOPLASTIC URETHANE POLYMER FILLED WITH CROSS-LINKED URETHANE POLYMER

[75] Inventors: Richard M. Gerkin; Rene Roberts, both of Charleston; Joy C. Hodges, Chesapeake, all of W. Va.

[73] Assignee: Union Carbide Corporation, New York, N.Y.

[22] Filed: Apr. 15, 1974

[21] Appl. No.: 460,933

[52] U.S. Cl. .............. 260/2.5 BE; 260/2.3; 260/858
[51] Int. Cl.² ..................... C08L 75/06; C08L 75/08
[58] Field of Search... 260/858, 2.3, 2.5 BE, 2.5 AK

[56] References Cited
UNITED STATES PATENTS

| | | | |
|---|---|---|---|
| 2,937,151 | 5/1960 | Ten Broeck | 260/858 |
| 3,123,577 | 3/1964 | Heiss | 260/2.3 |
| 3,300,417 | 1/1967 | McElroy | 260/2.3 |
| 3,406,127 | 10/1968 | Alexander | 260/2.3 |
| 3,663,469 | 5/1972 | Weissmahr | 260/2.5 BE |

*Primary Examiner*—Donald E. Czaja
*Assistant Examiner*—C. Warren Ivy
*Attorney, Agent, or Firm*—Charles J. Metz

[57] ABSTRACT

Thermoplastic urethane polymer is filled with crosslinked urethane polymer. The presence of the filler has little or no adverse effect on the properties of the thermoplastic urethane polymer.

12 Claims, No Drawings

THERMOPLASTIC URETHANE POLYMER FILLED WITH CROSS-LINKED URETHANE POLYMER

The invention relates to the art of thermoplastic urethane polymers. More specifically, the invention relates to the use of cross-linked urethane polymer as a filler for thermoplastic urethane polymers.

Thermoplastic urethane polymers are a commercially valuable class of materials having utility, inter alia, as molded articles in the automotive industry, wire and cable insulation, as gaskets, small gears, and other mechanical goods. Thermoplastic urethane polymers, however, are comparatively expensive, and for that reason, there is a widespread desire to find means for reducing their cost without adversely affecting properties. One prevalent way that the cost of plastics in general is reduced is to mix the plastic with a cheap filler/extender. In most cases, however, only a limited amount of filler/extender can be employed without adversely affecting the physical properties of the plastic.

The present invention is based upon the unexpected discovery that thermoplastic urethane polymers can be mixed with cross-linked urethane polymers to produce a filled composite having properties not significantly different from the unfilled thermoplastic urethane polymer. The said composites can be much less expensive than the unfilled polymer because scrap cross-linked urethane polymer, that would otherwise have been discarded, can be used as the filler.

Thermoplastic urethane polymers constitute a known class of compositions. They are linear polymers that are the reaction product of one or more organic diisocyanates with one or more diols. The organic diisocyanates most frequently employed are aromatic diisocyanates such as bis(4-isocyanatophenyl)methane ("MDI") and tolylene diisocyanate ("TDI"). MDI is the preferred diisocyanate.

The diol employed is often a mixture of a relatively high molecular weight diol and a low molecular weight diol, the latter often being called a chain extender. The high molecular weight diols most frequently employed are polyoxyalkylene glycols such as polyoxypropylene glycol, polyoxybutylene glycol, and mixed polyoxyethylene-oxypropylene glycol; polylactone diols such as the reaction product of epsilon-caprolactone with a difunctional initiator such as diethylene glycol or other diol, or diamine, or an aminoalcohol; and conventional polyesters such as the reaction product of adipic acid or terephthalic acid with ethylene glycol, diethylene glycol, or propylene glycol. The chain extender is illustrated by materials such as 1,4-butanediol, ethylene glycol, and neopentylene glycol.

The thermoplastic urethane polymer is produced by reacting equivalent proportions of diol with diisocyanate, to produce thereby an essentially linear polymer having a molecular weight of at least about 10,000 (number average), and up to about 50,000 or more (number average). The nature and production of thermoplastic urethane polymers is well known in the art.

The second major component employed in the invention is a cross-linked urethane polymer. Cross-linked urethane polymers are produced by reacting an organic polyisocyanate with a polyol, wherein at least one of the reactants has a functionality greater than two. The cross-linked urethane can be derived from a flexible, semi-rigid, or rigid foam, or from a nonfoamed elastomeric material.

The organic polyisocyanates employed to produce the cross-linked urethane polymer can be aromatic polyisocyanates such as TDI, MDI, and the polyisocyanate produced by phosgenating an anilineformaldehyde condensation product. While the foregoing are the preferred organic polyisocyanates, others can be employed, as is well known in the art.

The polyol used to produce the cross-linked urethane polymer can be, for example, a polyether, a polylactone, a conventional polyester, or a combination thereof. Specific illustrations include polyethers such as the alkylene oxide (ethylene oxide, propylene oxide, butylene oxide, or mixtures thereof) adducts of polyfunctional starters such as ethylene glycol, propylene glycol, glycerol, pentaerythritol, sorbitol, sucrose, phenol-aniline-formaldehyde condensation products, polyphosphoric acids, polyamines, and the like. Other polyols include polylactones such as the epsilon-caprolactone adducts of polyfunctional initiators such as polyols, aminoalcohols, and polyamines, and "conventional" polyesters such as poly (ethylene adipate), poly(ethylene phthalate), poly (neopentylene adipate), and poly(hexylene adipate). The polyols used in making cross-linked urethane polymers are often characterized by their hydroxyl numbers, which can vary from about 20 for very soft, flexible foams or elastomers, to as high as about 700 for rigid foams.

As was mentioned above, in producing the cross-linked urethane polymer, at least one of the reactants (i.e., polyol or polyisocyanate) has an average functionality greater than two. That is, at least some of the polyol will have at least three hydroxyl groups per molecule, or at least some of the polyisocyanate will have at least three isocyanato groups per molecule. Also, in some cases, even though a diol and a diisocyanate were used, cross-linking could be obtained by using a significant stoichiometric excess of the isocyanate, which can react with amido hydrogen in urethane or urea (when a water-blown foam is employed) to form allophanate or biuret linkages, respectively. However, this latter method for obtaining cross-linked urethane polymers is less preferred.

The cross-linked urethane polymer can be a flexible, semi-rigid, or rigid foam, or it can be a non-foamed elastomer. The techniques for making such materials are well known in the art, for instance, see generally Saunders & Frisch, "Polyurethanes: Chemistry and Technology", Interscience Publishers (New York), Part I, Chemistry 1962 and Part II, Technology 1964.

As was mentioned above, the nature and production of thermoplastic urethane polymers are also well known in the art. For instance, see Wells "New Families Of Polymers: Thermoplastic Elastomers", Vol. 5, J. Elastoplastics, pp. 102–108 (April 1973); Scheiner, "The T P Elastomers - Part 2: Thermoplastic Urethanes-Now a Swarm of Contenders" Plastics Technology, June 1973, pp. 37–42; and Critchfield et al., "Thermoplastic Urethane Elastomers" Rubber World, August 1971.

The cross-linked urethane polymer is added to the thermoplastic urethane polymer for the purpose of reducing the cost of the thermoplastic polymer, which is inherently more expensive than cross-linked polyurethane because both raw material and processing costs are higher. Thus, the cost of the thermoplastic urethane will be reduced by mixing it with either virgin or scrap cross-linked polyurethane. Surprisingly, very high proportions of cross-linked polyurethane can be added without having any significant adverse effect (or even any effect at all) on the physical properties of the thermoplastic polyurethane. Another unexpected result of the invention is that, at least to the naked eye, the blend of cross-linked and thermoplastic urethane polymers is apparently homogeneous. The resulting blend will have properties that are substantially the same as the unadulterated thermoplastic polyurethane.

An example of a blend that is contemplated by this invention would be a mixture of (1) a thermoplastic urethane polymer that is the reaction product of MDI and a poly(caprolactone) diol, and (2) a cross-linked polyurethane that was the reaction product of TDI and the propylene oxide adduct of glycerol. The resulting blend of these polymers will have properties not significantly different from the pure thermoplastic polymer. If a polymer were produced by reacting a mixture of MDI, TDI, the poly(caprolactone) diol, and the propylene oxide adduct of glycerol, the properties would be very different from the above-described blend. The major difference is that it would not be a thermoplastic material; rather, it would be a crosslinked polymer.

The blend or mixture of the invention is produced by dispersing the cross-linked urethane polymer in the thermoplastic urethane polymer. It is preferred to comminute the cross-linked urethane polymer prior to blending. Comminution can be achieved by high shear mixing, as for example, by as few as three or four passes of the cross-linked polymer through a chilled (e.g. 20°–25°C.) two-roll mill. Other methods of comminution could also be employed.

The comminuted cross-linked urethane polymer can then be blended with the thermoplastic urethane polymer by standard techniques, for instance, by milling on a heated mill, by extrusion mixing, by Banbury mixing, or other standard mixing technique that is used for thermoplastic polymers.

The proportion of cross-linked urethane polymer employed in the thermoplastic polymer is not a narrowly critical feature of the invention. While very low proportions of the order of 1 or 2 weight per cent of cross-linked urethane polymer can be used, the primary object of reducing the cost of the thermoplastic urethane polymer is not achieved unless higher loadings are used. (All percentages are based on the weight of cross-linked urethane polymer plus thermoplastic urethane polymer.) Therefore, much higher loadings are desired in order to achieve this object. As much as 50 per cent of cross-linked urethane polymer has been added with no adverse effect on properties of the thermoplastic polymer. The upper limit would be the point at which the mixture can no longer be processed by thermoplastic polymer processing techniques such as extrusion, calendering, injection molding, and compression molding. This limit may vary, depending upon the nature of the polymers, or upon what type of thermoplastic processing technique is to be used to fabricate the blend. In any event, it is readily ascertainable by the worker in the art.

In some end-use applications, even a large effect on properties can be tolerated. Therefore, the upper limit on the proportion of cross-linked urethane polymer is the point at which the blend no longer can be fabricated, as discussed above, even though the properties of the thermoplastic polymer may be changed significantly.

The Examples below illustrate the invention. All parts and proportions are by weight, unless otherwise stated.

The thermoplastic urethane polymer employed in the Examples was the reaction product of MDI, 1,4-butanediol, and a poly(epsilon-caprolactone) diol, having the following properties:

| | |
|---|---|
| Tensile Properties (ASTM-D412) | |
| Modulus-100%, psi | 1575 |
| Modulus-300%, psi | 3071 |
| Strength, ultimate, psi | 5425 |
| Elongation, ultimate, % | 500 |
| Hardness, Shore D (ASTM-D2240) | 48 |
| Tear Strength (ASTM-D624) | |
| Die C, pounds/linear inch | 793 |

The following isocyanates were employed in producing the cross-linked urethane polymers used in the Examples:

Isocyanate A - Quasi-prepolymer produced by reacting TDI with the propylene oxide adduct of glycerol having a hydroxyl number of 650, in such proportions that the quasi-prepolymer has a free NCO (i.e., isocyanato) content of 30.7 weight per cent.

Isocyanate B - Quasi-prepolymer produced by reacting TDI with dipropylene glycol in such proportions that the quasi-prepolymer has a free NCO content of 30.1 weight per cent.

The following polyols were employed in the Example:

Polyether A - an ethylene oxide capped propylene oxide adduct of glycerol, having a hydroxyl number of 21, and containing 20 weight per cent of in situ polymerized polyacrylonitrile;

Polyether B - Same as polyether A, except hydroxyl number is 28;

Polyether C - blend of 50 parts of ethylene glycol with 50 parts of the ethylene oxide adduct of aniline, wherein 2.4 moles of ethylene oxide per mole of aniline are used;

Polyester A - Diethylene glycol-initiated poly (epsilon-caprolactone), having a molecular weight of 2000;

Polyether D - Same as polyether B, except that the in situ polymerized polymer is a styreneacrylonitrile copolymer;

Polyether E - Same as polyether B, except that it contains no in situ polymerized vinyl polymer, and it has a hydroxyl number of 34;

Polyether F - Glycerol-started polyol prepared by reacting glycerol with a mixture of ethylene oxide and propylene oxide, having a hydroxyl number of 46;

Polyether G - Propylene oxide adduct of a mixture of sucrose and diethylenetriamine, having a hydroxyl number of 400; and Polyether H - Propylene oxide adduct of diethylenetriamine, having a hydroxyl number of 475.

EXAMPLE 1

A cross-linked urethane polymer was produced by reacting 121.8 grams of Polyether A, 18.2 grams of Polyether C, and 63.4 grams of Isocyanate B in the presence of 0.03 grams of dibutyltin dilaurate catalyst. The polymer produced in this manner was calculated to have an average molecular weight between cross-links of 14,150.

Three hundred grams of this cross-linked urethane polymer, in the form of a plaque, was powdered by passing between the rolls of a two-roll mill while cooling with 23°C. water. The rolls were then heated to 140°C. and 700 grams of thermoplastic polyurethane in the form of chips was milled until a sheet was formed. At that point the powdered cross-linked polyurethane was added and milling was continued for another five to ten minutes.

Circular plaques six inches in diameter and 125-mils thick were compression molded from the sheet taken off the mill and the following properties were measured: 100% modulus 1,453 psi, 300% modulus 3,041 psi; ultimate tensile strength 4,220 psi, elongation at break: 262%; Shore Hardness: 48D; die C Tear: 710 pli.

EXAMPLE 2

A polyester-based cross-linked polyurethane was prepared by reacting (a) 97.14 grams of Polyester A; (b) 68.53 grams of Isocyanate A; and (c) 19.08 grams of Polyether C, in the presence of 0.04 grams of dibutyltin dilaurate. The calculated average molecular weight between crosslinks is 3,079.

Seventy grams of this cross-linked polyurethane in the form of a plaque, was powdered by passing between the rolls of a two-roll mill while cooling. The rolls were then heated to 140°C and 240 grams of the thermoplastic urethane polymer in the form of chips was milled until a sheet was formed. The powdered cross-linked polyurethane was then added and milling was continued for another five to ten minutes.

Circular plaques 125 mils in thickness were compression molded from the sheet taken off the mill and the following properties were measured: 100% modulus 1,468 psi; 300% modulus 4,434 psi; ultimate tensile strength 5,706 psi; elongation at break; 357%; Shore hardness: 47 D; die C Tear: 633 pli.

EXAMPLE 3

A series of blends were made by techniques analagous to those described above in Examples 1 and 2. The formulations employed for producing the cross-linked urethane polymers are shown below in Table I. In each run, 0.03 parts of dibutyltin dilaurate catalyst was used per 100 parts of polyol:

TABLE I

| Run No. | Component | Grams |
|---|---|---|
| 1. | Polyether A | 121.8 |
|  | Polyether C | 18.2 |
|  | Isocyanate B | 63.4 |
| 2. | Polyether B | 121.8 |
|  | Polyether C | 18.2 |
|  | Isocyanate B | 31.69 |
|  | Isocyanate A | 32.69 |
| 3. | Polyether B | 121.8 |
|  | Polyether C | 18.2 |
|  | Isocyanate A | 12.67 |
|  | Isocyanate B | 52.3 |
| 4. | Polyether B | 121.8 |
|  | Polyether C | 18.2 |
|  | Isocyanate A | 6.3 |
|  | Isocyanate B | 58.8 |
| 5. | Polyether B | 121.8 |
|  | Polyether C | 18.2 |
|  | Isocyanate B | 65.38 |
| 6. | Polyether A | 121.8 |
|  | Polyether C | 18.2 |
|  | Isocyanate A | 6.14 |
|  | Isocyanate B | 57.07 |
| 7. | Polyether A | 121.8 |
|  | Polyether C | 18.2 |
|  | Isocyanate A | 12.27 |
|  | Isocyanate B | 50.74 |
| 8. | Polyether A | 121.8 |
|  | Polyether C | 18.2 |
|  | Isocyanate A | 30.72 |
|  | Isocyanate B | 31.69 |
| 9. | Polyether B | 121.8 |
|  | Polyether C | 18.2 |
|  | Isocyanate B | 19.62 |
|  | Isocyanate A | 44.36 |
| 10. | Polyether B | 121.8 |
|  | Polyether C | 18.2 |
|  | Isocyanate B | 6.54 |
|  | Isocyanate A | 57.03 |
| 11. | Polyether B | 121.8 |
|  | Polyether C | 18.2 |
|  | Isocyanate A | 63.37 |
| 12. | Polyester A | 97.14 |
|  | Polyether C | 19.08 |
|  | Isocyanate A | 68.53 |
| 13. | Polyester A | 97.14 |
|  | Polyether C | 17.17 |
|  | Isocyanate A | 65.78 |
| 14. | Polyether B | 191.4 |
|  | Polyether C | 4.77 |
|  | Isocyanate A | 28.5 |

The above-described cross-linked urethane polymers were powdered on a chilled two-roll mill, as explained in Example 1, and then blended with the thermoplastic urethane polymer as described in Example 1, in the proportions displayed below in TABLE II (percentages being based upon total weight of blend). TABLE II also displays physical properties of the blends.

TABLE II

| Blend of Thermoplastic Urethane Polymer Containing: | 100% Modulus psi | 300% Modulus psi | Tensile Strength psi | Elongation % | Hardness Shore D | Die C Tear, pli |
|---|---|---|---|---|---|---|
| 50% No. 1 | 1,573 | 3,824 | 5,597 | 403 | 44 | 636 |
| 33.3% No. 2 | 1,956 | 3,984 | 5,216 | 377 | 51 | 692 |
| 33.3% No. 3 | 1,807 | 3,505 | 4,001 | 340 | 48 | 699 |
| 33.3% No. 4 | 1,700 | 3,222 | 5,394 | 473 | 50 | 733 |
| 33.3% No. 5 | 1,715 | 3,326 | 5,633 | 460 | 51 | 732 |
| 33.3% No. 6 | 1,898 | 3,869 | 5,215 | 397 | 50 | 732 |
| 33.3% No. 7 | 1,823 | 3,621 | 4,889 | 400 | 52 | 720 |
| 33.3% No. 8 | 1,832 | 1,025 | 2,973 | 255 | 50 | 686 |
| 33.3% No. 9 | 1,813 | 4,436 | 5,183 | 337 | 51 | 671 |
| 33.3% No. 10 | 1,784 | 3,460 | 4,223 | 353 | 52 | 634 |
| 33.3% No. 11 | 1,964 | — | 4,671 | 293 | 52 | 647 |
| 22.5% No. 12 | 1,468 | 4,434 | 5,706 | 357 | 47 | 633 |
| 22.5% No. 13 | 1,406 | 4,116 | 6,086 | 390 | 44 | 620 |
| 22.5% No. 14 | 1,312 | 3,615 | 5,370 | 395 | 42 | 588 |
| None (control) | 1,575 | 3,071 | 5,425 | 500 | 48 | 793 |

EXAMPLE 4

A high-resilience seating foam was prepared by reacting a mixture composed of 60 parts of polyether E, 2.6 parts of water, 0.1 part of a mixture containing 70 percent bis(2-dimethylaminoethyl) ether and 30 percent dipropylene glycol, 0.3 part of a mixture of 1 part of 3-N,N-dimethylamino-N',N'-dimethylpropionamide and 2 parts of an ethylene oxide adduct of nonyl phenol having an average of 9 moles of ethylene oxide per mole, 0.36 part of a mixture of 1 part of DABCO and 2 parts of diethylene glycol, 0.015 part of dibutyltin dilaurate, 1.7 part of L-5303 silicone surfactant, 5.5 parts of trichlorofluoromethane blowing agent, and 39.1 parts of a blend of 80 parts tolylene diisocyanate and 20 parts of polyphenylmethane isocyanate.

A 100-gram piece of a foam prepared in this manner was powdered by milling it on a two-roll mill while chilling the rolls with cold water. The powder was then blended with 250 grams of thermoplastic urethane polymer on the same mill, the rolls being steam-heated at 150°C. One-hundred and twenty-five mil plaques were then compression molded from the sheet taken off the mill and the following properties were measured: 100% modulus 1,361 psi; 300% modulus 3,618 psi; ultimate tensile strength 4,875 psi, elongation at break 383 per cent; Shore hardness 43 D; die C tear 604 pli.

EXAMPLE 5

A high-resilience slab stock foam was prepared by reacting a mixture of 40 parts polyether E, 60 parts polyether B, 2 parts water, 0.8 part diethanolamine, 0.1 part of a diethylene glycol solution containing 70 per cent bis(2-dimethylaminoethyl)ether, 0.2 part of a mixture made of 1 part DABCO and 2 parts diethylene glycol, 0.75 part L-5305 silicone surfactant, 0.06 part dibutyltin dilaurate, 2 parts 1.3 dichloropropyl-2-bis[di(chloroethoxy)methylene phosphate] flame retardant, and 26 parts tolylene diisocyanate.

One hundred grams of this foam was then powdered as described above and mixed with 250 grams of thermoplastic urethane polymer on a two-roll mill. A compression molded plaque had the following properties: 100% modulus: 1,647 psi; 300% modulus: 3,425 psi; ultimate tensile strength: 5,058 psi; elongation at break: 440%; Shore hardness: 44D; die C tear: 688 pli.

EXAMPLE 6

A standard slab stock foam was prepared by reacting a mixture of 100 parts of polyether F, 4 parts water, 0.125 part of a mixture consisting of 67 parts dimethylethanolamine, 23.1 parts bis(2-dimethylaminoethyl) ether, and 9.9 parts dipropylene glycol, 1 part L-540 silicone surfactant, 0.225 part stannous octoate, and 49.2 parts tolylene diisocyanate.

One hundred grams was then powdered as described above and mixed with 250 grams of thermoplastic urethane polymer on a two-roll mill. A compression molded plaque had the following properties: 100% modulus, 1,318 psi; 300% modulus: 2,717 psi; ultimate tensile strength: 4,197 psi; elongating at break: 443%; Shore hardness: 43 D; die C tear: 623 pli.

EXAMPLE 7

A rigid foam was prepared by reacting a mixture of 85 parts polyether G, 15 parts polyether H, 1.5 parts water, 20 parts trichlorofluoromethane blowing agent, 1 part L-5420 silicone surfactant, 0.8 part N,N,N',N'-tetramethyl-1,3-butanediamine, and 102 parts tolylene diisocyanate residue.

The sample of rigid foam was then powdered on a two-roll mill and blended on the same mill with thermoplastic urethane polymer such that the final concentration of rigid foam powder in the thermoplastic was 20.8 per cent. The properties of a compression molded plaque were as follows: 100% modulus: 4285 psi; ultimate tensile strength: 4,167 psi; elongation at break: 127 per cent; Shore hardness: 64 D; die C tear: 610 pli.

What is claimed is:

1. A mixture, capable of being processed by thermoplastic polymer techniques, said mixture comprising an intimate blend of a previously produced thermoplastic urethane polymer and a comminuted crosslinked urethane polymer, said cross-linked urethane polymer being derived from a flexible urethane foam, a semi-rigid urethane foam, a rigid urethane foam, or a non-foamed urethane elastomeric polymer.

2. The mixture of claim 1 wherein said mixture is an apparently homogeneous blend.

3. The mixture of claim 1 wherein said thermoplastic urethane polymer comprises the reaction product of (a) an aromatic diisocyanate, (b) a polyoxyalkylene glycol wherein the individual oxyalkylene units have from 2 to 4 carbon atoms, a poly(epsilon-caprolactone) diol, or a hydroxylterminated polyester of a dicarboxylic acid and a dihydric alcohol, and (c) a low molecular weight diol.

4. The mixture of claim 3 wherein said aromatic diisocyanate is bis(4-isocyanatophenyl) methane.

5. The mixture of claim 1 wherein said cross-linked urethane polymer comprises the reaction product of (a) an organic polyisocyanate, and (b) a polyhydric alcohol, at least one of said reactants (a) and (b) having an average functionality greater than two.

6. The mixture of claim 5 wherein said organic polyisocyanate is tolylene diisocyanate, bis(4-isocyanatophenyl)methane, or a polymethylene polyphenyl isocyanate produced by phosgenation of an aniline/formaldehyde reaction product.

7. The mixture of claim 3 wherein said cross-linked urethane polymer comprises the reaction product of (i) an organic polyisocyanate, and (ii) a polyhydric alcohol, at least one of said reactants (i) and (ii) having an average functionality greater than two.

8. The mixture of claim 7 wherein said organic polyisocyanate is tolylene diisocyanate, bis(4-isocyanatophenyl)methane, or a polymethylene polyphenyl isocyanate that comprises the phosgenated product of an aniline/formaldehyde condensation product.

9. The mixture of claim 1 wherein said cross-linked urethane polymer is derived from a non-foamed elastomer or a flexible foam.

10. The mixture of claim 3 wherein said cross-linked urethane polymer is derived from a non-foamed elastomer or a flexible foam.

11. The mixture of claim 5 wherein said crosslinked urethane polymer is derived from a non-foamed elastomer or a flexible foam.

12. The mixture of claim 7 wherein said cross-linked urethane polymer is derived from a non-foamed elastomer or a flexible foam.

* * * * *